United States Patent [19]

Iwawaki

[11] 3,752,935

[45] Aug. 14, 1973

[54] AUTOMATIC SWITCH DEVICE FOR MAGNETIC RECORDING AND REPRODUCING DEVICE

[75] Inventor: Yasutaka Iwawaki, Tokyo, Japan

[73] Assignee: Canon Kabushiki Kaisha, Tokyo, Japan

[22] Filed: Jan. 6, 1971

[21] Appl. No.: 104,433

[30] Foreign Application Priority Data

Jan. 20, 1970 Japan ......... 45/6014 (utility model)
Jan. 27, 1970 Japan ......... 45/8453 (utility model)
Jan. 27, 1970 Japan ......... 45/8454 (utility model)

[52] U.S. Cl. ............................ 179/100.2 S, 35/35 C
[51] Int. Cl. ............................................ G11b 15/02
[58] Field of Search ............... 179/100.2 B, 100.2 S, 179/100.2 VC; 35/35 C

[56] References Cited

UNITED STATES PATENTS 3,436,662 4/1969 Kobayashi ................. 179/100.1 VC
3,550,289 12/1970 Orita ......................... 179/100.1 VC

FOREIGN PATENTS OR APPLICATIONS 730,664 12/1953 Great Britain ...................... 35/35 C
771,104 10/1955 Great Britain ...................... 35/35 C

*Primary Examiner*—Bernard Konick
*Assistant Examiner*—Jay P. Lucas
*Attorney*—Ward, McElhannon, Brooks & Fitzpatrick

[57] ABSTRACT

An automatic change-over mechanism for a magnetic recording-reproducing device which contains therein an endless magnetic recording medium and which may be additionally connected with a separate conventional magnetic recording-reproducing device without reforming the interior construction thereof. The change-over mechanism basically comprises detector means for detecting an electrical variation appearing at the external terminal of the separate magnetic recording-reproducing device when it is in its reproduce mode, and switching means electrically associated with the detector means and operated thereby to change over the connected recording-reproducing device between its operation mode for transferring the information reproduced by the separate recording-reproducing device and its operation mode for reproducing the transferred information, whereby the magnetic recording-reproducing device connected to the separate one may be auotmatically operable to repeatedly reproduce the transferred information after the separate device has been stopped from its reproducing operation.

3 Claims, 7 Drawing Figures

AUTOMATIC SWITCH DEVICE FOR MAGNETIC RECORDING AND REPRODUCING DEVICE

BACKGROUND OF THE INVENTION

1. Field of the Invention

This invention relates to an automatic change-over mechanism for a magnetic recording-reproducing device, and more particularly to an automatic change-over mechanism for a magnetic recording-reproducing device of the type which may be connected to a commonly used tape recorder and contains an endless magnetic recording medium.

2. Description of the Prior Art

Magnetic recording-reproducing devices for magnetically recording and reproducing information by means of magnetic recording medium such as magnetic tape, sheet or the like are useful to record and reproduce any oral information with a relatively great ease and readiness, and therefore such devices have been widely used for various purposes including the learning of foreign languages or music and the dictation of messages and the like in offices.

It is often the case that some particular information thus recorded must be repeatedly reproduced and listened to so that such information may be fully learned or remembered, and this gives a rise to the need for a magnetic recording-reproducing device which can satisfy such requirement with a relatively great simplicity.

For example, in case where a magnetic recording-reproducing device is utilized for the purpose of dictation, there may arise a need to again reproduce the information recorded on a magnetic tape as by rewinding that tape whenever the information once reproduced may be found to contain some portions which are vague in meaning or otherwise difficult to recognize or comprehend aurally. With the conventional magnetic recording-reproducing devices, however, a second reproduction of the information which has once been reproduced involves cumbersome operations for rewinding the tape by a predetermined length and again playing back the tape by that length, and such cumbersome operations must be repeated again and again until the information is fully grasped by the listener.

There have also been proposed various applications of the magnetic recording-reproducing device for the educational purposes such as foreign language learning or the like. A typical one of such applications, as disclosed in U.S. Pat. No. 2,876,561, requires the learner to fulfill the procedures of playing back a pre-recorded magnetic tape storing therein teaching materials such as word pronunciations and sentences to be learned, listening to the reproduced information while recording his own oral practice on the exercise track of the pre-recorded tape if required, then rewinding and playing back the same tape to reproduce the pre-recorded teaching materials and his own recorded oral practice so as to compare them with each other to recognize his faults or defects, if any. However, such an application again requires cumbersome manipulations such as rewinding the pre-recorded tape by a predetermined length after the reproduction thereof, stopping it and changing over the mode of operation for reproducing the recorded information, and this has seriously hampered the smooth development of the learner's will to learn.

In order to enable such pre-recorded information to be repeatedly reproduced for listening through simple operations, there has been proposed a system using an endless magnetic recording medium in addition to the master tape storing therein the pre-recorded information, whereby during the play-back of the master tape the information reproduced thereby is transferred onto the endless magnetic recording medium, which may thereafter be played back as often as desired with the master tape stopped, so that the transferred information on the endless magnetic recording medium may be listened to again and again until it is fully comprehended or mastered. With this system, however, an auxiliary magnetic recording medium in an endless form such as endless magnetic tape, magnetic disc or drum is required in addition to the pre-recorded master tape and this leads to a very much complicated construction of the entire device as well as to the need to provide a greater number of control members for effecting the change-over of the operation mode, which in turn leads to a greater complexity of operation.

Also, in view of the fact that most of the conventional magnetic recording-reproducing devices are of the type which employs a single tape such as the aforesaid master tape, the above-described system encounters a difficult problem that any magnetic recording-reproducing device to be used with such system must be reformed so as to match the particular system.

SUMMARY OF THE INVENTION

It is an object of the present invention to overcome the foregoing disadvantages and provide an auxiliary magnetic recording-reproducing device which may be additionally connected with any master magnetic recording-reproducing device of the conventional type to thereby enable the repeated reproduction of recorded information.

It is another object of the present invention to provide an attachment for an auxiliary magnetic recording-reproducing device which contains therein an endless magnetic recording medium and which can be associated with a conventional magnetic recording-reproducing device without reforming the interior construction thereof, to thereby automatically effect the change-over of the auxiliary magnetic recording-reproducing device between its operation mode for transferring the information reproduced by the magnetic recording-reproducing device and its operation mode for reproducing the transferred information.

These and other objects and features of the present invention will become more apparent from the following detailed description of specific embodiments thereof taken in conjunction with the accompanying drawings.

The general concept of the present invention consists in an auxiliary magnetic recording-reproducing device having an endless magnetic recording medium which may be additionally connected with a conventionally used magnetic recording-reproducing device (hereinafter referred to as "master tape recorder") without reforming the latter's construction in any way. An electrical variation appearing outside the master tape recorder during the reproducing mode thereof may be detected, and the detection output is used to change over the auxiliary magnetic recording-reproducing device into the mode for transferring the reproduce output of the master tape recorder onto the endless recording medium when the master tape recorder is in its reproduce mode, and into the mode for reproducing the transferred information when the master tape recorder is stopped. In response to the change-over of the master tape recorder from its reproduce mode to its stop mode or vice versa, the auxiliary magnetic recording-reproducing device is automatically changed over from its transfer mode to its reproduce mode or vice versa. When it is desired to repeatedly reproduce and listen to the information reproduced by the master tape recorder and transferred by the auxiliary recording-reproducing device, the master tape recorder may be stopped and in response thereto, the auxiliary recording-reproducing device is automatically changed over into its reproduce mode.

If the master tape recorder is of the type whose tape driving motor is driven under the control of an external remote switch, the electrical variation appearing outside the master tape recorder may be an electrical variation appearing at the remote switch connection terminal of the master tape recorder and the change-over of the operation mode of the auxiliary magnetic recording-reproducing device may be automatically effected in response to a detection output representing such electrical variation.

If the master tape recorder is of the type which has no external remote switch, a difference in the amount of power consumed by that tape recorder between its reproduce mode and its stop mode may be detected by a detector member such as transformer or the like connected in the power supply circuit, so that the change-over of the operation mode of the auxiliary recording-reproducing device may be automatically effected in response to a detection output representing such difference.

Alternatively, detection may be made of back noise (tape noise) including the noise present in the reproduce output of the master tape recorder during its reproduce mode, so that the mode change-over of the auxiliary magnetic recording-reproducing device may automatically take place in response to such detection output.

In either of these cases, the master tape recorder requires no reform of its interior construction and the electrical variation appearing outside the recorder as a result of its mode change-over is picked up by the auxiliary magnetic recording-reproducing device which has an endless magnetic recording medium and which is additionally connected with the master tape recorder, whereby the auxiliary recording-reproducing device may be automatically changed over between its transfer mode and its reproduce mode. Such mode change-over of the auxiliary magnetic recording-reproducing device may be controlled simply by operating the master tape recorder in accordance with the operation mode thereof, thereby reproducing any desired part of the recorded information in a repeated manner.

DESCRIPTION OF THE PREFERRED EMBODIMENTS

Figure 1:
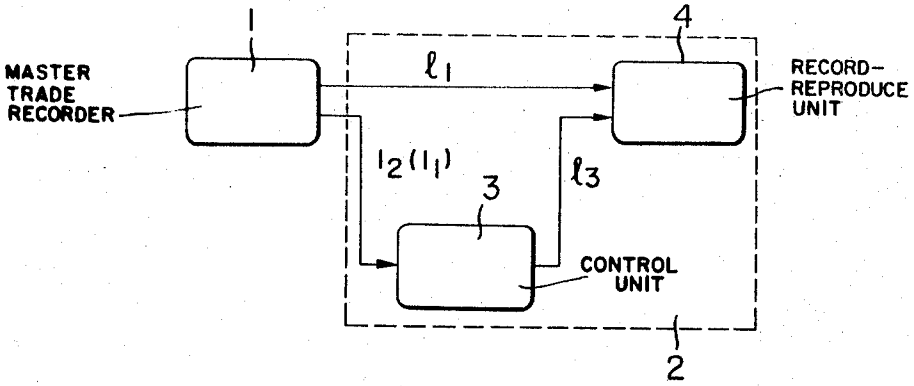
FIG. 1 is a block diagram showing the electrical connection between the master tape recorder and the auxiliary magnetic recording-reproducing device of the present invention.

Referring to FIG. 1, reference numeral 1 designates a commonly used tape recorder serving as a master tape recorder, to which is connected an auxiliary magnetic recording-reproducing device of the present invention (hereinafter referred to as "auxiliary tape recorder") which is generally indicated by 2. The auxiliary tape recorder 2 has an automatic change-over control unit 3 provided therein. A record-reproduce unit 4 is electrically connected with the control unit 3 so that the operation mode of the former may be changed over by the output of the latter.

Desired information pre-recorded on a magnetic recording medium such as magnetic tape (not shown) may be reproduced by the master tape recorder I and vocalized as by a loudspeaker contained in the auxiliary tape recorder 2 during its reproduce mode, as will be described later. The record-reproduce unit 4 of the auxiliary tape recorder 2 contains an endless magnetic recording medium such as endless tape as will also be described. Part of the reproduce output of the master tape recorder 1 may be applied through a connection line $l_1$ so as to be transferred onto the endless tape in the record-reproduce unit 4, and when the master tape recorder 1 is stopped in order to enable the transferred information to be repeatedly reproduced in the manner to be described, control signals may be applied from the control unit 3 through a connection line $l_3$ so as to change over the record-reproduce unit into its operation mode for the repeated reproduction of the transferred information.

Figure 2:
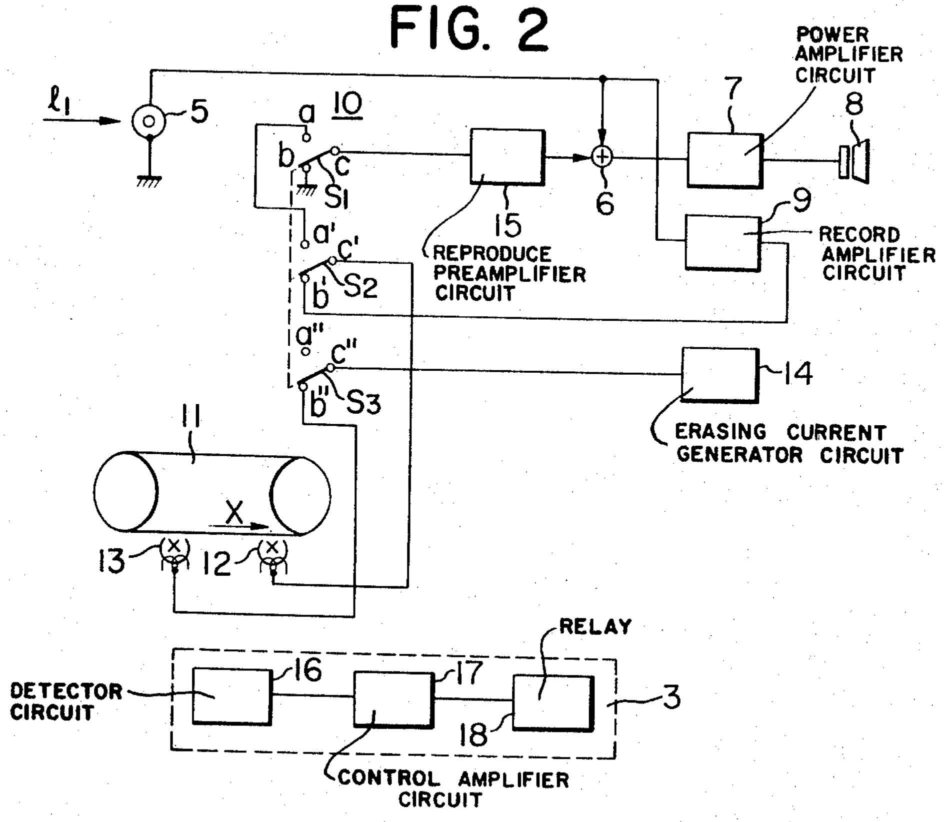
FIG. 2 is a block diagram showing the circuit of the record-reproduce unit of the auxiliary magnetic recording-reproducing device.

Referring to FIG. 2, there is shown more fully the record-reproduce unit 4, which includes an input terminal 5 for applying the reproduce information signals through the line $l_1$, a mixer-amplifier circuit 6, a power amplifer circuit 7, a loudspeaker 8 connected with the output of the power amplifier circuit 7, a record amplifier circuit 9, and a switch group 10 comprising change-over switches $S_1$, $S_2$ and $S_3$ associated with a relay to be described. These switches are such that their respective movable contacts $c$, $c'$ and $c''$ are normally engaged with respective fixed contacts $a$, $a'$ and $a''$ but changed over into engagement with other respective fixed contacts $b$, $b'$ and $b''$ upon energization of the relay. The record-reproduce unit 4 further includes an endless magnetic tape 11 driven to move at a predetermined velocity by an unshown driving mechanism, a record-reproduce head 12, an erase head 13 disposed in side-by-side relationship with the record-reproduce head 12 and upstream thereof as viewed in the direction of movement X of the tape 11, an erasing current generator circuit 14 connected with the erase head 13 through the change-over switch $S_3$, and a reproduce-preamplifier circuit 15 connected with the record-reproduce head 12 through the change-over switches $S_1$ and $S_2$.

The switch group 10 comprising the change-over switches $S_1$–$S_3$ provides the contacts of a relay 18 energized by a detector circuit 16 and a control amplifier circuit 17 in the control unit 3, as is schematically shown at the bottom of FIG. 2 and will be more fully described later.

Figure 3:
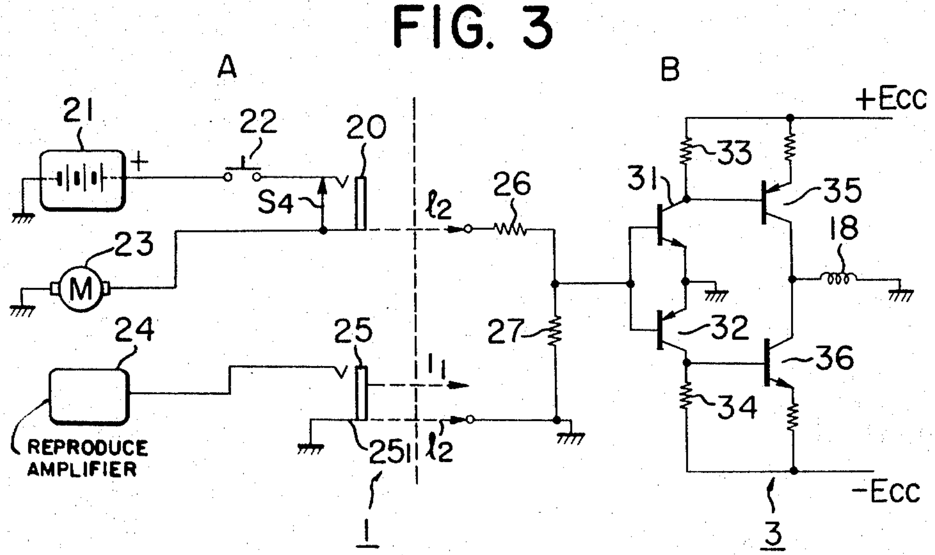
FIG. 3 is a circuit diagram of the control unit of the auxiliary magnetic recording-reproducing device shown in FIG. 2.

The control unit 3 is fully shown in FIG. 3, which is divided into two portions A and B by a dotted line. The portion A refers to the master tape recorder and the portion B the control unit 3 of the auxiliary tape recorder. These two portions are electrically connected together through a line $l_2$. In the portion A or the master tape recorder, there is provided a jack terminal 20 for connection with a remote switch (not shown) for controlling the driving of the master tape in the master tape recorder. As shown in FIG. 3, when the remote switch is not connected with the jack terminal 20, the latter has its contact $S_4$ closed as is usual with any known jack terminal. There is further shown a DC source 21 for a motor for driving the master tape recorder, the DC source being provided by a battery or an A-D converter. A switch 22 is inserted between the positive terminal of the DC source 21 and the jack terminal 20 and adapted to close when the master tape recorder is changed over into its reproduce mode. Reference numeral 23 designates the DC motor. In the master tape recorder indicated by A, there is also provided a reproduce signal output amplifier 24 whose output is connected with an external output terminal 25, which in turn is connected, on the one hand, with the reproduce signal input terminal 5 (FIG. 2) of the auxiliary tape recorder through the line $l_1$, and on the other hand, grounded through a grounding pole $25_1$ connected to the line $l_2$.

During the reproduce mode of the master tape recorder, the switch 22 is closed and the reproduce amplifier 24 applies reproduce signals representing the information stored on the unshown master magnetic tape to the output terminal 25, so that an electrical variation appears at the output terminals 20 and 25 respectively when the master tape recorder is changed over into its reproduce mode.

In the control unit 3 of the auxiliary tape recorder indicated by B in FIG. 3, resistors 26 and 27 are connected with the remote switch connection terminal 20 through the line $l_2$ so as to drive detection signals representing the reproducing operation of the master tape recorder. These resistors 26 and 27 are connected between the remote switch connection terminal 20 and the ground since the grounding pole $25_1$ of the terminal 25 is grounded to the auxiliary tape recorder through the line $l_2$. The control unit 3 further includes NPN and PNP transistors 31 and 32 which, together with collector load resistors 33 and 34, constitute the detector circuit 16 as shown in FIG. 2. Amplifier transistors 35 and 36 have their respective bases connected with the collectors of the transistors 31 and 32. These amplifier transistors 35 and 36 are of PNP and NPN types, respectively, and they together constitute the amplifier circuit 17 of FIG. 2. The collector outputs of these transistors 35 and 36 are commonly connected with the relay 18, which is connected in the collector circuit of the transistors 35 and 36 so that the relay may be energized upon conduction of one of these two transistors.

The transistors 31 and 32 connected with the transistors 35 and 36 respectively are of different types, namely NPN and PNP types as aforementioned, and therefore, when the potential appearing at the jack terminal 20 or the potential at that terminal of the DC source which is connected with the jack terminal 20 is positive, the transistors 31 and 35 will conduct to energize the relay 18. Conversely, when the said potential is negative, the transistors 32 and 36 will conduct to energize the relay 18. In the arrangement of FIG. 3, that terminal of the DC source 21 connected with the jack terminal 20 is shown at a positive potential, so that only the transistors 31 and 35 are operative while the transistors 32 and 36 remain inoperative.

In operation, an unshown operating member is operated to close the switch 22 to thereby start the motor 23 so as to drive the master tape recorder 1 into the reproduce mode, whereby the information stored on the master tape starts to be reproduced. The positive voltage of the motor driving power source 21 appears directly at the jack terminal 20 and at the same time a reproduce output also appears at the terminal 25, so that the electrical variation at the terminal 20 is applied to the bases of the transistors 31 and 32 through the line $l_2$.

Thus, the transistors 31 and 35 are rendered conductive and the relay 18 is energized through +Ecc and transistor 35. As a result, the switch group 10, i.e., switches $S_1$—$S_3$ assume their respective positions as shown in FIG. 2, where their respective movable contacts $c$, $c'$ and $c''$ are connected with the fixed contacts $b$, $b'$ and $b''$. Consequently, the reproduce output of the master tape recorder appearing at the terminal 25 is applied to the input terminal 5 through the line $l_1$ and further passed through the mixer-amplifier circuit 6 and the power amplifier circuit 7 to the loudspeaker 8, where the reproduce output is vocalized, and at the same time it is applied to the record-reproduce head 12 through the record amplifier circuit 9 and the change-over switch $S_2$ (contacts $b'$–$c'$). The record-reproduce head 12 transfers the reproduced information from the master tape recorder 1 onto the tape 11 which is moving in the direction X while being subjected to the erasing action by the erase head 13 disposed upstream of the head 12.

When it is desired to again listen to the information reproduced through the loudspeaker 8, the master tape recorder 1 may be stopped by opening the switch 22 to eliminate the potential appearing at the terminal 20 and turn off the transistors 31 and 35 to thereby deenergize the relay 18.

As a result, the switches $S_1$–$S_3$ forming the switch group 10 have their movable contacts $c$, $c'$ and $c''$ changed over into engagement with the fixed contacts $a$, $a'$ and $a''$, respectively, so that the erase head 13 is caused to release its erasing action by the opening of the switch $S_3$. Thus, the information transferred onto the endless tape 11 may be reproduced by the record-reproduce head 12 and vocalized by the loudspeaker 8 through switch $S_2$ ($c'$–$a'$), switch $S_1$ ($a$–$c$), reproduce preamplifier 15, mixer-amplifier circuit 6 and power amplifier circuit 7. In this way, the transferred information on the endless tape 11 may be repeatedly reproduced by the loudspeaker 8 as the endless tape 11 makes each one round.

When the master tape recorder 1 is then brought into the reproduce mode, the relay 18 is again energized in the described manner to change over the switches $S_1$, $S_2$ and $S_3$ and thereby allow the reproduced information to be transferred onto the endless tape 11.

In the described embodiment, as will be appreciated, the electrical variation occurring at the remote switch connection terminal in response to the change-over between the reproduce mode and the stop mode may be detected by the detection circuit in the auxiliary tape recorder, and the automatic change-over of the auxiliary tape recorder between the transfer mode and the reproduce mode may be accomplished by the detection output, whereby any desired part of the reproduced information may be repeatedly reproduced simply in response to the mode change-over of the master tape recorder.

Figure 4:
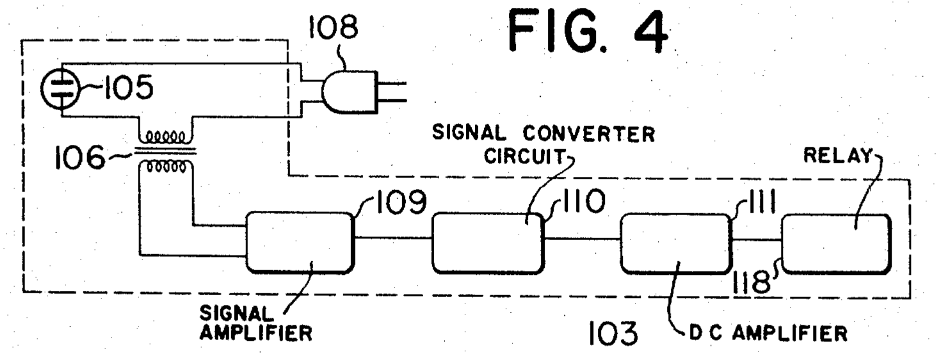
FIG. 4 is a block diagram showing a modification of the control unit.
Figure 5:
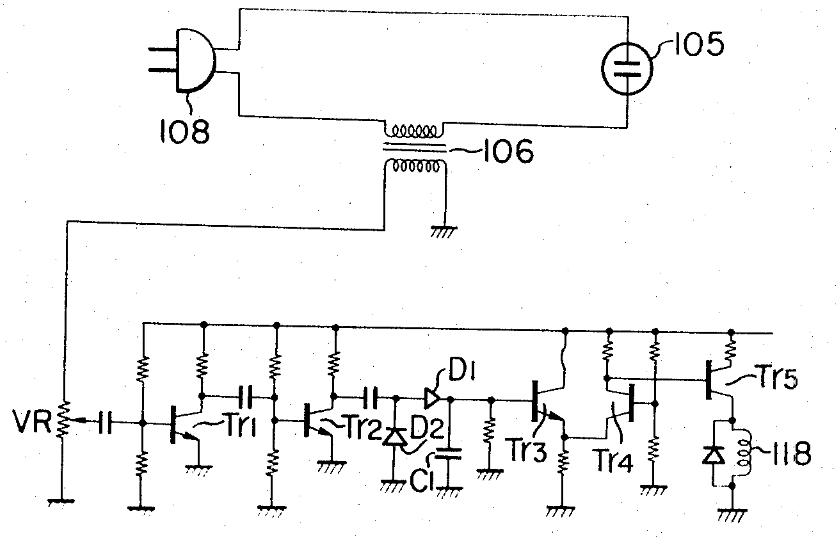
FIG. 5 is a circuit diagram of the control unit of FIG. 4.

FIGS. 4 and 5 show a modification of the control unit 3 shown in FIG. 3 and this modification is most suitable for use with master tape recorders of the type which is operable by AC power. In FIG. 4, the control unit of the auxiliary tape recorder is generally indicated by 103 and includes a socket 105 for connection with a power supply cord from a master tape recorder, a signal detecting transformer 106 whose primary winding is connected with an AC source in series with the master tape recorder, a plug 108 for connection with the AC source, an AC signal amplifier 109, a signal converter circuit 110 comprising a rectifer circuit and a smoother circuit, a DC amplifier 111, and a relay 118 energized by the output of the DC amplifier 111, the relay 118 corresponding to the relay 18 of FIG. 3. A variation in the AC power, whose consumption rate is increased during the reproducing operation of the master tape recorder, appears at the secondary winding of the transformer 106 and such variation is amplified by the AC amplifier 109 and converted into a DC variation by the signal converter circuit 110, the output of which is amplified through the DC amplifier 111 to energize the relay 118.

The arrangement of FIG. 4 is depicted in further detail in FIG. 5, which includes a sensitivity regulating volume VR connected with the output of the transformer 106, amplifier transistors Tr1 and Tr2, a rectifiersmoother circuit D1-D2-C1, DC amplifiers Tr3 and Tr4 constituting a differential amplifier circuit, and a transistor Tr5 for driving the relay 118.

With the plug 108 connected with the AC source, AC power is supplied through the output 105 to the master tape recorder, which is thereby driven into its reproduce mode. The power consumed in the master tape recorder is detected by the transformer 106, whose detection is amplified by the transistors Tr1 and Tr2 and converted into a DC component by the circuit D1-D2-C1, then applied to the base of the transistor Tr3. The input applied to the base of the transistor Tr3 and a bias applied to the base of the transistor Tr4 are compared with each other, and the result of the comparison is amplified and thereafter applied to the base of the transistor Tr5, which will thus energize the relay 118 so as to change over the auxiliary tape recorder into the transfer mode in the manner as described previously.

When the master tape recorder is playing back its tape, the information stored therein is transferred onto the endless tape in the auxiliary tape recorder. When the master tape recorder is stopped each time a desired section of the pre-recorded information has been reproduced, the relay 118 is energized in accordance with the difference in the power consumption of the master tape recorder so that the auxiliary tape recorder is automatically changed over from the transfer mode into the reproduce mode. Thus, after the master tape recorder is stopped, the auxiliary tape recorder may be operated for the repeated reproduction of the information transferred from the master tape recorder. In this way, the pre-recorded information may be first reproduced by the master tape recorder so that the user can listen thereto, and then the same information transferred onto the auxiliary tape may be repeatedly reproduced so that the user can listen thereto as frequently as he desires. All these operations can take place entirely automatically. Thus, the user can repeatedly listen to the same part of the pre-recorded information simply by a single operation of the master tape recorder, and this is very practical and highly effective for the foreign language learning or other purposes which require repeated recognition or confirmation.

Figure 6:
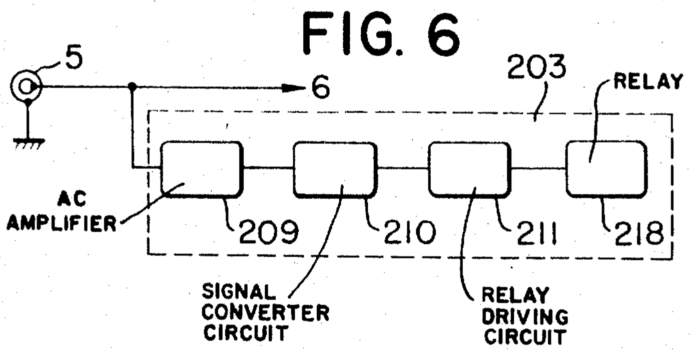
FIG. 6 is a block diagram showing another modification of the control unit.
Figure 7:
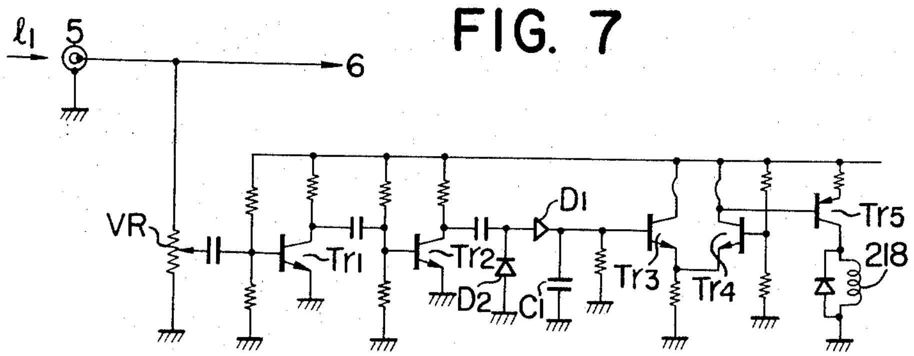
FIG. 7 is a circuit diagram of the control unit shown in FIG. 6.

FIGS. 6 and 7 show another modification of the automatic change-over control circuit for the auxiliary tape recorder according to the present invention. In FIG. 6, the control unit of the auxiliary tape recorder 2 which is generally indicated by 203 receives as input the reproduce signals from the master tape recorder 1 through the reproduce signal input terminal 5. As shown, the control unit 203 includes an amplifier 209, a signal converter circuit 210, a relay driving circuit 211, and a relay 218 corresponding to the relay 18 of FIG. 2 for changing over the switches $S_1$, $S_2$ and $S_3$.

In FIG. 6, the reproduce signal input terminal 5 is connected with the amplifier 209 sufficiently sensitive even to background noise which is peculiar to the reproduce mode and overlaping with the reproduce signals from the master tape recorder. The output of the amplifier 209 is connected with the signal converter circuit 210 comprising a rectifier circuit and a smoother circuit and directed to convert the AC output signals from the amplifier 209 into DC signals. The signal converter circuit 210 has its output connected with the relay driving circuit 211 which comprises a threshold detector circuit and a DC amplifier. The output of the relay driving circuit 211 is in turn connected with the relay 218 which is adapted to change over the auxiliary tape recorder between the transfer mode and the repeated reproduce mode in the same manner as described with respect to the relay 18 of the first embodiment.

When the master tape recorder is reproducing the pre-recorded information, the AC amplifier 209 may be supplied not only with the information reproduce signals but also with the background noise such as tape noise peculiar to the reproduce mode of the master tape recorder. Therefore, as long as the master tape recorder is operating in the reproduce mode, the signal converter circuit 210 continues to supply the relay driving circuit 211 with a DC output exceeding the DC voltage corresponding at least to the background noise. Thereupon, the threshold detector in the relay driving circuit may be adjusted substantially to the aforesaid DC voltage so that the relay 218 may be energized as soon as the master tape recorder is driven into the reproduce mode. Thus, the reproducing operation of the master tape recorder can be detected without fail, and accordingly the auxiliary tape ,recorder can be controlled and changed over into the transfer mode. When the master tape recorder stops its reproducing operation, the information reproduce signals and the background noise will both disappear, whereupon the relay 218 is deenergized to change over the auxiliary tape recorder into the mode for repeatedly reproducing the transferred information.

The circuit arrangement of the described control unit 203 is further shown in FIG. 7, which includes a sensitivity regulating volume VR, amplifier transistors Tr1 and Tr2, rectifier-smoother circuit D1-D2-C1, DC amplifiers Tr3 and Tr4 constituting a differential amplifier circuit, and transistor Tr5 for driving the relay 218. When the master tape recorder is producing a reproduce output through a line $l_1$, the background noise contained in that reproduce output is amplified by the transistors Tr1 and Tr2, then converted into a DC component by the circuit D1-D2-C1, and applied to the base of the transistor Tr3. The input applied to the base of the transistor Tr3 and a bias applied to the base of the transistor Tr4 are compared with each other and the result of the comparison is amplified and applied to the base of the transistor Tr5, which will thus energize the relay 218 to change over the operation mode of the auxiliary tape recorder.

Thus, when the master tape recorder is playing back its pre-recorded tape, the information thus reproduced is transferred onto the endless tape in the auxiliary tape recorder. When the master tape recorder is stopped each time a section of the pre-recorded information has been reproduced, the relay 218 is energized in accordance with the difference in the consumed power of the master tape recorder so that the auxiliary tape recorder is automatically changed over from the transfer mode to the reproduce mode, and after the stoppage of the master tape recorder, the auxiliary tape recorder may repeatedly reproduce the information transferred from the master tape onto the endless tape in the auxiliary tape recorder.

While the various embodiments of the present invention have been shown and described as using an endless magnetic recording medium such as endless magnetic tape, it will be apparent that the present invention can achieve the same result by using a magnetic recording medium in the form of disc, drum or sheet whose function is similar to that of the endless magnetic tape.

The described embodiments also utilize a relay as the means for changing over the operation mode of the auxiliary tape recorder, whereas not only the mechanical switching means such as relay but also a semiconductor circuit incorporating electronic switching means such as transistor, SCR or the like may be utilized to obtain the same effect.

Thus, according to the present invention, there is provided an auxiliary tape recorder which may be additionally connected with a conventionally used master tape recorder for reproducing pre-recorded information without reforming the construction of the master tape recorder, whereby the auxiliary tape recorder may be automatically operable to repeatedly reproduce any particular portion of the pre-recorded information when the master tape recorder is stopped from its reproducing operation. By being used with the conventionally used master tape recorder, the auxiliary tape recorder can be readily and simply operated to effect the repetitive reproduction without requiring any troublesome change-over operation and it is thus highly effective and practical when used for various purposes which presuppose the need for the repeated reproduction of certain desired information as experienced in the cases of dictation, language learning and the like.

I claim:

1. A magnetic record and reproducing device comprising:

input terminals for receiving an electrical signal from a signal generating source;

a power amplifier for amplifying the signal applied from said input terminals;

a record amplifier connected to said input terminals for amplifying the electrical signal received from said input terminals;

an endless tape for recording the signal thereon;

a recording and reproducing head for recording said signal on said endless tape and for reproducing the signal previously recorded on the endless tape;

an erase head disposed in side-by-side relationship with respect to said recording and reproducing head and upstream in the direction of movement of said endless tape for erasing signals previously recorded on said endless tape;

an erasing current generating circuit for generating an erasing current to erase the signals recorded on said endless tape;

switch means comprising first, second and third double throw switches ganged together for simultaneous movement, said first switch being switchable to connect to one contact of said second switch to present a reproducing mode, said second switch being switchable to connect said record amplifier and said recording and reproducing head to present a recording mode, and said third switch being switchable to connect said erasing current generating circuit and said erase head;

a reproduce-preamplifier for amplifying the signal read out of said endless tape by said recording and reproducing head;

means for selectively applying the signal from said reproducing preamplifier to said power amplifier;

a transducer connected to said power amplifier for converting the electrical signal to an audio signal; and a control unit responsive to the signal from said signal generating source for controlling said switch means;

said control unit comprising, a detector for detecting the presnce and the absence of the signal generated by said signal generating source, means responsive to the presence of the signal detected by said detector for actuating said switch means to switch the device from the reproducing mode to the recording mode responsive to the absence of the signal detected by said detector for actuating said switch means to switch the device from the recording mode to the reproducing mode, said detector comprising:

input terminals connectable to a power supply;

connecting terminals connected to said input terminals for supplying said signal generating source with a voltage;

detecting means connected between said input terminals and said connecting terminals for detecting a current flowing therethrough;

a discriminator for generating an output when the current detected by said detecting means is over a predetermined value, thereby detecting whether said signal generating source is in an operating condition, said detecting means comprising, a current transformer having a primary winding connected between one of said input terminals and one of said connecting terminals and a secondary winding connected to said discriminator.

2. A magnetic recording and reproducing device comprising:

input terminals for receiving an electrical signal from a signal generating source;

a power amplifier for amplifying the signal applied from said input terminals;

a record amplifier connected to said input terminals for amplifying the electrical signal received from said input terminals;

an endless tape for recording the signal thereon;

a recording and reproducing head for recording said signal on said endless tape and for reproducing the signal previously recorded on the endless tape;

an erase head disposed in side-by-side relationship with respect to said recording and reproducing head and upstream in the direction of movement of said endless tape for erasing signals previously recorded on said endless tape;

an erasing current generating circuit for generating an erasing current to erase the signals recorded on said endless tape;

switch means comprising first, second and third double throw switches ganged together for simultaneous movement, said first switch being switchable to connect to one contact of said second switch to present a reproducing mode, said second switch being switchable to connect said record amplifier and said recording and reproducing head to present a recording mode, and said third switch being switchable to connect said erasing current generating circuit and said erase head;

a reproduce-preamplifier for amplifying the signal read out of said endless tape by said recording and reproducing head;

means for selectively applying the signal from said reproducing preamplifier to said power amplifier;

a transducer connected to said power amplifier for converting the electrical signal to an audio signal; and a control unit responsive to the signal from said signal generating source for controlling said switch means;

said control unit comprising, a detector for detecting the presence and the absence of the signal generated by said signal generating source, means responsive to the presence of the signal detected by said detector for actuating said switch means to switch the device from the reproducing mode to the recording mode responsive to the absence of the signal detected by said detector for actuating said switch means to switch the device from the recording mode to the reproducing mode, said signal generating source being another magnetic recording and reproducing device having a first terminal for deriving a potential appearing across a motor and a second terminal for deriving a reproducing output;

said control unit comprising a resistor connected across said first terminal and said second terminal, the end which is connected to the second terminal being also connected to ground, and an amplifier circuit for amplifying the signal at said resistor, thereby detecting whether said motor of said other recording and reproducing device operates.

3. A magnetic recording and reproducing device according to claim 2, wherein said amplifier circuit comprises a positive amplifier and a negative amplifier connected in a push-pull relation.

* * * * *